Patented Mar. 8, 1949

2,463,977

UNITED STATES PATENT OFFICE 2,463,977

POLYAMIDE-POLYESTER CONDENSATION PRODUCTS AND PROCESSES OF PRODUCING THE SAME

Edward L. Kropa, Old Greenwich, Conn., assignor to American Cyanamid Company, New York, N. Y., a corporation of Maine No Drawing. Application March 16, 1944, Serial No. 526,826

8 Claims. (Cl. 260—78)

This invention relates to the production of polyamide-polyester resins and protein modifications thereof.

Various polyamide resins, polyester resins, or mixed polyamide-polyester resins have been proposed particularly for use in the manufacture of artificial fibers. Most of these resins which have previously been proposed are extremely insoluble in all of the ordinary solvents. Consequently many such resins are not particularly adapted for use in coating compositions or in other applications involving the use of ordinary organic solvents.

One object of this invention is to prepare mixed polyester-polyamide resins which are soluble in ordinary organic solvents.

Another object of this invention is to produce resins of the mixed polyester-polyamide type which have good water resistance.

Still another object of this invention is to prepare mixed polyester-polyamide resins modified with protein.

These and other objects are attained by reacting a monoalkylol amine with a dicarboxylic acid which does not form anhydrides merely upon heating at ordinary atmospheric pressures and which does not contain an alpha, beta-unsaturation. Modified products may be obtained by including with these reactants an amino acid, an hydroxy acid, a protein or combinations thereof.

The following examples illustrate the practice and are given by way of illustration and not in limitation.

EXAMPLE 1

202 parts of weight of sebacic acid (1 mol) is heated with 61 parts by weight of monoethanolamine (1 mol) in such a manner that any volatile products may leave the reaction chamber. The reaction is preferably carried out in an inert atmosphere, e. g., in nitrogen, and at about 150°–170° C. After about five hours the reaction temperature is raised to about 260° C. and the pressure reduced to about 1 mm of mercury for about two hours. The resulting resin is tough and somewhat waxy at room temperatures. This resin swells and dissolves slowly in a hot solvent mixture of butanol and xylene.

EXAMPLE 2

The same proportions of sebacic acid and monoethanolamine as used in Example 1 are mixed together and allowed to stand until the exothermic reaction is complete. The mixture is then heated at about 200° C. in a nitrogen atmosphere for about six hours. The reaction is continued at about the same temperature for an additional three hours at reduced pressure, e. g. about 1 mm. The resulting resin is soluble in a mixture of 50% ethanol-50% toluene when hot but tends to precipitate on long standing. The toluene-ethanol solution of the resin may be used to impregnate textile material thereby stiffening the fiber. Furthermore, coating compositions are formed by dissolving the resin in a suitable solvent such as ethanol-toluene mixtures. Such compositions may be applied to metal or other surfaces to form coatings which after mild stoving yield films having good adherence to the surfaces upon which they are applied, and such films do not whiten upon contact with water.

EXAMPLE 3

202 parts by weight of sebacic acid is added to hot ethanol (convienently about 100–200 parts by weight) and 61 parts by weight of monoethanolamine is admixed and warmed until homogeneous. The solution is stirred and filtered hot. An ethanolamine salt of sebacic acid precipitates from the filtrate upon cooling. In this way a relatively pure salt may be obtained which will more readily form a polymer containing alternating amido and ester linkages. By heating this salt at about 200° C. for several hours, a resinous material similar to but in some ways superior (as in color) to that obtained in Examples 1 and 2 may be obtained.

EXAMPLE 4

300 parts by weight of adipic acid and about 126 parts by weight of monoethanolamine were heated in vacuo for about six to nine hours yielding an extremely viscous, tough, light resinous mass which solidifies upon standing one to three days. The resin is soluble in hot 50% butanol-50% xylene solution but only slightly soluble in the cold solution. It is soluble in both hot and cold formamide.

EXAMPLE 5

When phthalic anhydride is reacted with monoethanolamine in the same general manner as that described above, a crystalline compound is formed, presumably beta-hydroxyethane phthalimide. Accordingly, phthalic anhydride or phthalic acid may not be used to produce resinous materials such as are produced according to this invention except in minor proportions as modifying agents. Other acids which form anhydrides merely upon heating at ordinary atmospheric pressures are also unsuitable for the production of resinous materials with monoalkylol amines. Maleic anhydride or maleic acid reacts with monoethanolamine to produce a deep red, extremely brittle resinous mass which is soluble in water. Obviously such products do not have any particular utility for most of the commercial usages of synthetic resins. Other acids such as maleic acid which contain an alpha, beta-unsaturation are also unsuitable for the practice of my invention except in minor proportions as modifying agents for such resins as those produced according to Examples 1 to 4.

101 parts by weight of sebacic acid (0.5 mol) is heated with about 62 parts by weight (1 mol) of monoethanolamine at about 200° C. for about six hours yielding a viscous liquid which soidifies at room temperature. The solid is soluble in hot butanol-toluene solution and in formamide.

17 parts by weight of the solid ethanolamine sebacate and about 6 parts by weight of maleic anhydride are heated at about 170° C. for about one hour thereby forming a resin which gels or is cured after further heating at about 180° C. for about one half hour.

Small quantities of phthalic acid (or anhydride) or other acids which form anhydrides merely upon heating may be used as modifiers in the same general way as the maleic type of acid.

EXAMPLE 6

Monoethanolamine (1 mol) adipic acid (1 mol), and p-aminobenzoic acid (1 mol) are heated for several hours at about 200° C. in an inert atmosphere, preferably nitrogen. Heating is continued for several hours under reduced pressure, e. g., 1–2 mm. yielding a resinous material. During the reaction a small portion of the p-aminobenzoic acid is decomposed into aniline and during the early stages of the reaction the aniline distills out of the reaction mixture.

EXAMPLE 7

2-amino, 2-methyl propanol-1 (1 mol) is treated with sebacic acid (1 mol) and the mixture is heated in a nitrogen atmosphere at about 180° C. for about ten hours. A thick viscous resin is obtained which does not possess the waxy property shown by the corresponding monoethanolamine resin. It is compatible with butylated urea-formaldehyde lacquers or other alkylated or unalkylated urea-aldehyde resins.

EXAMPLE 8

Cyclohexanonoxime is rearranged by means of sulfuric acid (specific gravity = 1.7) according to the method described in J. Biol. Chem., 106, 387 (1934) and the epsilon-capryl lactam is hydrolyzed with water according to known methods. The solution is neutralized with sodium hydroxide to adjust the pH to about 7. The aqueous solution containing epsilon-aminocaproic acid and sodium sulfate is evaporated to dryness and the epsilon-aminocaproic acid extracted with a phenol, e. g., cresylic acid. By adding dioxane to the cresylic acid after the extraction, the epsilon-aminocaproic acid is precipitated. The acid may be purified by dissolving it in a small quantity of water and then precipitating with alcohol and dioxane.

2.8 parts by weight of monoethanolamine, 9.2 parts by weight of sebacic acid and 12 parts by weight of epsilon-aminocaproic acid with about 200 parts by weight of cresylic acid and 10 parts by weight of high flash naphtha are heated azeotropically for about five hours. During this reaction about 3.3 parts by weight of water are removed. The reaction mixture is heated for about six hours and the product is precipitated with mineral spirits and washed with ethyl acetate. A waxy powder is obtained which melts at about 246° C. Such resins are particularly suitable in the preparation of films but may also be used in the production of artificial fibers by extrusion.

Obviously either the pure epsilon-aminocaproic acid or the crude acid mixed with cresylic acid may be used for reaction with the alkylol amine and acid, e. g., ethanolamine and sebacic acid as described in this example.

EXAMPLE 9

50 parts by weight of sebacic acid, 15 parts by weight of monoethanolamine and 50 parts by weight of zein (the protein from corn) are dissolved in about 250 parts by weight of p-cresol and heated. During the reaction both hydrogen sulfide and ammonia gas are evolved as well as water. The solution is heated for about one and one half hours at about the boiling point of p-cresol. The solution is then heated at about 1 mm. pressure until the cresol and other volatile matter is removed, yielding a soft resinous mass which is soluble in toluene. The resin products may be used in coating, film formation, fiber formation, etc.

EXAMPLE 10

Solution A 10 parts by weight of casein is mixed with 10 parts by weight of phenol and heated to about 90° C. A rubbery viscous gel is obtained from which long fibers could be drawn. Casein which has been degraded by treatment with alkali forms a much more fluid solution in phenol.

Solution B 10 parts by weight of monoethanolamine sebacate resin (prepared according to Examples 1–3) is mixed with about 10 parts by weight of phenol and heated to about 90° C. Solution B is thus formed and is somewhat less viscous than Solution A.

Solutions A and B may then be mixed and any small amount of insoluble matter may be removed by decantation. Such resinous syrups may be used in coating or in the production of filaments, films, ribbons, etc. One of the methods by which sheets, films, etc. may be obtained is by extrusion through dies and spinnerettes. Since the viscosity of the phenolic solutions of the resin with or without protein is relatively high, such extrusion processes are preferably carried out at elevated temperatures (e. g., 70°–100° C.). On the other hand, solutions of relatively low viscosity which are amenable to treatment at room temperatures may be obtained by cutting the original viscous solution with a suitable solvent, e. g., ethanol, or by using suitably pretreated resin. The resinous solution may be extruded into a medium in which the resin is substantially insoluble but in which the solvent for the resin is quite soluble, e. g., water. The solvent such as phenol is dissolved in the water leaving the extruded resin in sheet or fiber form. The fibers may be spun, washed and dried. Any slight residue of phenol which may remain in the sheets or fibers may be precipitated by reaction with formaldehyde which can be added to the washing bath prior to or after spinning.

Other solvent materials may be used in place of phenol in the examples and processes described above, e. g., formamide.

As is apparent from examination of Examples 9 and 10 proteins may be incorporated with the mixed polyester-polyamide resin either by chemical combination as in Examples 9 or by simple mixing as in Example 10.

My process may be carried out at temperatures between about 180° C. and about 220° C., preferably at about 200° C. The reaction is advantageously carried out under reduced pressures, e. g., 1–10 mm. of mercury. The time of reaction will vary according to the reactants, the size of the batch, the heat transfer, etc. Generally under reduced pressures of 1–10 mm. the reaction will require from about six to eight hours while with increased pressure the time will be longer. If the reaction be heated under atmospheric pressure and then for about an equal period, under reduced pressure (e. g., 1–10 mm.) the total reaction time will be about doubled. If the reaction be carried out at atmospheric pressure entirely, the reaction time will be about two to three times that when the reaction is carried out entirely under reduced pressure. The variations in the reaction time at other pressures or combination of pressures will be somewhat proportional. The reaction is continued for sufficient time to react substantially all of the reactive groups. Acid number determinations and tests for free amino groups will indicate when the reaction is substantially complete. The "amine number" which is indicative of the free amine groups may be determined by titration with benzeneazonaphthyl amine. The reaction may be considered to be substantially complete when the acid number and "amine number" are each less than about 5, although the reaction is preferably continued until even lower acid and "amine" numbers are obtained.

Any monoalkylol amine may be substituted for the monoethanolamine used in the examples including: propanolamine, butanolamine, 2-amino-3-hexanol, 3-amino-4-heptanol, 2-amino-4-pentanol, 5-amino-4-octanol, 3-amino-3-methyl 2-butanol, 2-amino-2-methyl-3-hexanol, 2-amino-2-methyl-1-butanol, 3-amino-3-methyl-2-butanol, 3-amino-3-methyl-4-heptanol, 3-amino-2-methyl-4-heptanol, and N-substituted alkylol amines such as phenylmonoethanolamine. The alkylol amines which have side chains are especially desirable in order to obtain resins having good solubility and compatibility characteristics. The monoalkylol amines contain only two reactive groups and, therefore, are particularly suitable for use according to my invention since gelation and infusibility will not occur. Di- and trialkylol amines contain more than two reactive groups and tend to gel the reaction materials very rapidly. Furthermore, as in the case of the trialkylol amines, there is the possibility of salt formation which increases the tendency to form gels. Resins produced from di- and trialkylol amines are generally quite water sensitive. Di- and trialkylol amines are, therefore, unsuitable for the practice of my invention.

It is possible to use a small portion (e. g., 1–5%) of a dihydric alcohol (which does not contain an amine group) as well as similar portions of an alpha, beta-unsaturated acid (e. g., maleic acid, fumaric acid, the corresponding anhydrides, etc.) in order to obtain resins which may be cured relatively rapidly. If either of these types of materials be used, it is preferable that the general procedure described in Example 5 be followed.

It is usually convenient to react the alkylol amine with the theoretical equivalent of the dicarboxylic acid which does not form an anhydride and which does not contain an alpha, beta unsaturation, less the molar quantity of the maleic acid or phthalic acid to be added as a modifier. Similarly if an alcohol is to be added as a modifier the theoretical equivalent of alkylol amine is reduced by the molar equivalent of alcohol to be added.

In order to obtain resins having higher melting points than those obtained by the reaction of monoalkylol amine with a dibasic acid as described above, it may be desirable to introduce additional amino groups. One way in which this may be done is by the use of amino acids. Among these are p-aminobenzoic acid, hydrogenated p-aminobenzoic acid and aminocaproic acids, e. g., epsilon-aminocaproic acid. Unsubstituted beta-amino acids may not be used inasmuch as they lose ammonia upon heating. On the other hand, $\alpha,\alpha'$ di-substituted beta-amino acids may be used inasmuch as they do not lose ammonia. The substituents on the alpha carbon atom may be hydrocarbon radicals, e. g., methyl groups. Diamino acids, triamino acids and other polyamino acids as such or amides thereof, may be used but they tend to gel the material. Generally the amino acids which contain three or more methylene groups separating the amino groups and the carboxyl group are preferred. These acids may be used either in the acid or lactam form. If they be used in the lactam form, it is preferable that the reaction be conducted in a solvent containing a phenol. While glycine may be used to modify the resin, it is generally undesirable since substantial quantities tend to increase the water solubility of the resulting product.

The resins may be modified with any of the hydroxy acids, e. g., glycolic acid, lactic acid, hydracrylic acid, $\alpha$-hydroxyisobutyric acid, $\omega$-hydroxybutyric acid, $\omega$-hydroxycaproic acid, $\omega$-hydroxydecanoic acid, $\omega$-hydroxymyristic acid, 11-hydroxystearic acid, ricinoleic acid, etc. To obtain microcrystalline resins, the hydroxy acid should have at least 3 carbon atoms and desirably 5 carbon atoms between the hydroxyl group and the carboxyl group or else the acid should be di-substituted on the same carbon atom as, for example, 2,2-dimethyl hydracrylic-1-acid. When the lower members of the series of hydroxy acids are employed such as, for example, glycolic acid and lactic acid, amorphous resins are obtained. The term "hydroxy acid" as used herein is used in the ordinary chemical way to designate those aliphatic hydroxy acids, the homologous series of which begins with glycolic acid. The following example is illustrative of the use of hydroxy acids:

EXAMPLE 11

| | Parts |
|---|---|
| Lactic acid (85%) | 106 |
| Sebacic acid | 202 |
| Monoethanolamine | 611 |

The lactic acid and monoethanolamine are heated in a suitable reaction vessel provided with an agitator and heated by means of an oil bath maintained at about 158° C. for 1½ hours and at about 172° C. for an additional two hours. During the heating about 21 parts of water distill off. The sebacic acid is added after which the reacting mixture is heated from about 170° C. to about 210° C. and maintained at that temperature for about 11 hours during which time about 34 parts of water distill off. The resulting product is an extremely viscous dark-colored resinous material.

The product could be used as a sealing agent, as a plasticizer and for many other purposes.

Dicarboxylic acids suitable for producing my polyester-polyamide resin are those which do not form an anhydride upon heating at ordinary atmospheric pressures. Acids having at least four carbon atoms between the two carboxyl groups are preferred. Examples of suitable acids are: adipic, azelaic, sebacic, terephthalic, hexahydroterephthalic, pimelic, brassylic, etc. It may also be desirable to employ acids having side chain such a methyl or other lower alkyl groups in order to increase the solubility and compatibility characteristics of the resulting resins. Resins made according to my invention may be admixed with drying oil acid constituents, e. g., polymerized drying oils, either before or after condensation or polymerization. Such compositions are particularly desirable in air drying coating compositions.

Polyester-polyamide resins made according to this invention may be mixed with rubber in which case they act not only as anti-oxidants, plasticizers, and to lower the viscosity and power required during milling, but also as accelerator promoters. These resins may also be mixed with ester gum and various alkyd resins particularly the oil-modified, air-drying resins to produce lacquers, varnishes, enamels, etc. It may also be desirable to incorporate such polyester-polyamide resins with phenol-formaldehyde resins, urea-formaldehyde resin, thiourea-formaldehyde resins, melamine-formaldehyde resins, and other amino-aldehyde resins. In some instances the resins may interact if formaldehyde be present or is added. Obviously suitable fillers, dyes, pigments, etc. may be mixed with the resins in order to produce various commodities. In certain instances my resins may be used as solvents or miscibilizing agents for dyes.

This application is a continuation-in-part of my copending application Serial No. 275,819, filed May 26, 1939, now Patent No. 2,440,516.

Obviously many variations and modifications may be made in the process and in the compositions described above without departing from the spirit and scope of the invention as described in the appended claims.

I claim:

1. A process for making polymers which comprises heating a reaction mixture including a monoaminomonohydric alcohol in which the amino nitrogen carries at least one hydrogen atom and in which the amino and hydroxyl groups are separated by an acyclic chain, an aliphatic dicarboxylic acid which does not form an anhydride upon heating and which contains no alpha, beta unsaturation and an aliphatic monohydroxymonocarboxylic acid the hydroxyl of which is alcoholic, the carboxyl groups in said mixture being present in an amount substantially equimolecularly equivalent to the sum of the amino and alcoholic hydroxyl groups, and continuing the heating until the reactants in said reaction mixture are substantially completely reacted.

2. A process for making polymers which comprises heating a reaction mixture including a monoaminomonohydric alcohol in which the amino nitrogen carries at least one hydrogen atom and in which the amino and hydroxyl groups are separated by an acyclic chain, an aliphatic dicarboxylic acid which has at least four carbon atoms between the carboxyl groups which does not form an anhydride upon heating, and which contains no alpha,beta unsaturation and an aliphatic monohydroxymonocarboxylic acid the hydroxyl of which is alcoholic, the carboxyl groups in said mixture being present in an amount substantially equimolecularly equivalent to the sum of the amino and alcoholic hydroxyl groups, and continuing the heating until the reactants in said reaction mixture are substantially completely reacted.

3. A polymer comprising the reaction products obtained by heating a mixture consisting of bifunctional reactants and including a dicarboxylic acid which has at least four carbon atoms between the carboxyl groups and which contains no alpha,beta unsaturation, a monoaminomonohydric alcohol in which the amino nitrogen carries at least one hydrogen atom and in which the amino and hydroxyl groups are separated by an acyclic chain, and an aliphatic monohydroxymonocarboxylic acid the hydroxyl group of which is in the ω position, the carboxyl groups in said mixture being present in an amount substantially equimolecularly equivalent to the sum of the amino and alcoholic hydroxyl groups, until the reactants in said mixture are substantially completely reacted.

4. A polymer as in claim 3 wherein the monohydroxymonocarboxylic acid has at least five carbon atoms between the hydroxyl and carboxyl groups.

5. A process which comprises heating a mixture consisting of bifunctional reactants and including a dicarboxylic acid which has at least four carbon atoms between the carboxyl groups and which contains no alpha,beta unsaturation, a monoaminomonohydric alcohol in which the amino nitrogen carries at least one hydrogen atom and in which the amino and hydroxyl groups are separated by an acyclic chain, and an aliphatic monohydroxymonocarboxylic acid the hydroxyl group of which is in the ω position, the carboxyl groups in said mixture being present in an amount substantially equimolecularly equivalent to the sum of the amino and alcoholic hydroxyl groups, until the reactants in said mixture are substantially completely reacted.

6. A polymer comprising the reaction product obtained by heating a mixture including a monoaminomonohydric alcohol in which the amino nitrogen carries at least one hydrogen atom and in which the amino and hydroxyl groups are separated by an acyclic chain, an aliphatic dicarboxylic acid which does not form an anhydride upon heating and which contains no alpha,beta unsaturation and an aliphatic monohydroxymonocarboxylic acid until the reactants in said mixture are substantially completely reacted, the carboxyl groups in said mixture being present in an amount substantially equimolecularly equivalent to the sum of the amino and alcoholic hydroxyl groups.

7. A polymer comprising the reaction product obtained by heating a mixture including a monoaminomonohydric alcohol in which the amino nitrogen carries at least one hydrogen atom and in which the amino and hydroxyl groups are separated by an acyclic chain, an aliphatic dicarboxylic acid which has at least four carbon atoms between the carboxyl groups, which does not form an anhydride upon heating, and which contains no alpha,beta unsaturation and an aliphatic monohydroxymonocarboxylic acid until the reactants in said mixture are substantially completely reacted, the carboxyl groups in said mixture being present in an amount substantially equimolecularly equivalent to the sum of the amino and alcoholic hydroxyl groups.

8. A polymer comprising the reaction product obtained by heating a mixture including a monoaminomonohydric alcohol in which the amino nitrogen carries at least one hydrogen atom and in which the amino and hydroxyl groups are separated by an acyclic chain, an aliphatic dicarboxylic acid which does not form an anhydride upon heating and which contains no alpha,beta unsaturation and an aliphatic monohydroxymonocarboxylic acid having at least five carbon atoms between the hydroxyl and carboxyl groups until the reactants in said mixture are substantially completely reacted, the carboxyl groups in said mixture being present in an amount substantially equimolecularly equivalent to the sum of the amino and alcoholic hydroxyl groups.

EDWARD L. KROPA.

REFERENCES CITED

The following references are of record in the file of this patent:

UNITED STATES PATENTS

| Number | Name | Date |
| --- | --- | --- |
| 2,094,608 | Krutchevsky | Oct. 5, 1937 |
| 2,396,248 | Christ | Mar. 12, 1946 |

FOREIGN PATENTS

| Number | Country | Date |
| --- | --- | --- |
| 376,929 | Great Britain | July 21, 1932 |
| 378,596 | Great Britain | Aug. 18, 1932 |